(12) United States Patent
Wagle et al.

(10) Patent No.: US 9,376,608 B2
(45) Date of Patent: Jun. 28, 2016

(54) INVERT EMULSION DRILLING FLUID CONTAINING A HYGROSCOPIC LIQUID AND A POLYMERIC SUSPENDING AGENT

(75) Inventors: Vikrant Wagle, Mahrashtra (IN); Shadaab Maghrabi, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 993 days.

(21) Appl. No.: 13/187,170

(22) Filed: Jul. 20, 2011

(65) Prior Publication Data

US 2013/0020083 A1   Jan. 24, 2013

(51) Int. Cl.
*C09K 8/12* (2006.01)
*C09K 8/36* (2006.01)

(52) U.S. Cl.
CPC .... *C09K 8/12* (2013.01); *C09K 8/36* (2013.01)

(58) Field of Classification Search
None
See application file for complete search history.

(56) References Cited

U.S. PATENT DOCUMENTS

| | | | | |
|---|---|---|---|---|
| 2,867,278 A * | 1/1959 | Mallory et al. | | 166/295 |
| 3,108,068 A * | 10/1963 | Weiss et al. | | 507/108 |
| 3,442,842 A * | 5/1969 | Von Wulf | | 524/591 |
| 3,650,951 A * | 3/1972 | Marsh et al. | | 507/131 |
| 4,588,032 A * | 5/1986 | Weigand et al. | | 166/291 |
| 5,072,794 A * | 12/1991 | Hale et al. | | 175/50 |
| 5,198,416 A | 3/1993 | Hale et al. | | |
| 5,494,120 A | 2/1996 | Hale et al. | | |
| 5,955,401 A | 9/1999 | Liao | | |
| 5,977,031 A | 11/1999 | Patel | | |
| 6,662,871 B2 * | 12/2003 | Kercheville et al. | | 166/255.1 |
| 6,887,832 B2 | 5/2005 | Kirsner et al. | | |
| 7,067,460 B2 * | 6/2006 | Summerhill et al. | | 507/103 |
| 7,091,159 B2 | 8/2006 | Eoff et al. | | |
| 7,278,485 B2 * | 10/2007 | Kirsner et al. | | 166/305.1 |
| 7,462,580 B2 | 12/2008 | Kirsner et al. | | |
| 7,488,704 B2 | 2/2009 | Kirsner et al. | | |
| 7,906,461 B2 * | 3/2011 | Dino et al. | | 507/117 |
| 7,939,470 B1 | 5/2011 | Wagle et al. | | |
| 2003/0144153 A1* | 7/2003 | Kirsner et al. | | 507/100 |
| 2004/0002426 A1* | 1/2004 | Temple et al. | | 507/100 |
| 2004/0043905 A1* | 3/2004 | Miller et al. | | 507/100 |
| 2004/0102332 A1* | 5/2004 | Thompson et al. | | 507/100 |
| 2005/0032652 A1* | 2/2005 | Kirsner et al. | | 507/100 |
| 2006/0052261 A1 | 3/2006 | Kray et al. | | |
| 2006/0058203 A1 | 3/2006 | Laufer et al. | | |
| 2007/0078062 A1* | 4/2007 | Kirsner et al. | | 507/103 |
| 2008/0015118 A1* | 1/2008 | Oyler et al. | | 507/138 |
| 2008/0076682 A1 | 3/2008 | Jones et al. | | |
| 2009/0095535 A1* | 4/2009 | Nguyen | | 175/72 |
| 2010/0009873 A1* | 1/2010 | Dino et al. | | 507/117 |
| 2010/0076145 A1* | 3/2010 | Bobsein et al. | | 524/505 |
| 2010/0087566 A1* | 4/2010 | Ballard | | 523/130 |
| 2010/0152069 A1* | 6/2010 | Harris | | 507/201 |
| 2011/0105661 A1* | 5/2011 | Aksman | | 524/199 |

FOREIGN PATENT DOCUMENTS

| | | | | |
|---|---|---|---|---|
| CA | 2451926 A1 | 6/2005 | | |
| EP | 2154224 A1 | 2/2010 | | |
| GB | 2223255 A * | 4/1990 | | C09K 7/06 |
| WO | WO 2009151567 A1 * | 12/2009 | | C08J 3/02 |

OTHER PUBLICATIONS

Clark et al, Polyacrylamide/Potassium-Chloride Mud for Drilling Water-Sensitive Shales, Society of Petroleum Engineers, 5514, Jun. 1976, 719-27.
Reid, et al, Filed Evaluation of a Novel Inhibitive Water-Based Drilling Fluid for Tertiary Shales, Society of Petroleum Engineers, 24979, pp. 171-180; Nov. 1992.
Burrows, et al, Benchmark Performance: Zero Barite Sag and Significantly Reduced Downhole Losses with the Industry's First Clay-Free Synthetic-Based Fluid, Society of Petroleum Engineers, 87138, 1-8, 2004.
Oort, et al, New Flat-Rheology Synthetic-Based Mud for Improved Deepwater Drilling, Society of Petroleum Engineers, 90987, 1-11, 2004.
Harlan, et al, Salt-Free Internal Phase Oil Mud Provides Improved Performance, American Association of Drilling Engineers, AADE-06-DF-HO-08, 1-9, Apr. 2006.
Accolade, Halliburton Energy Services, Inc. Literature, 2007.
Encore, Halliburton Energy Services, Inc. Literature, 2007.
Baroid Product Data Sheet, Halliburton Energy Services, Inc. Literature, 2010.
Baracarb Product Data Sheet, Halliburton Energy Services, Inc. Literature, 2010.
Barodense Product Data Sheet, Halliburton Energy Services, Inc. Literature, 2010.
Micromax, Halliburton Energy Services, Inc. Literature, 2007.
Adapta Product Data Sheet, Halliburton Energy Services, Inc. Literature, 2010.
Accolade, Halliburton Energy Services, Inc. Literature, Dec. 2007.
Encore Base Product Data Sheet, Halliburton Energy Services, Inc. Literature, Apr. 5, 2010.

(Continued)

*Primary Examiner* — Angela M DiTrani
*Assistant Examiner* — Anuradha Ahuja
(74) *Attorney, Agent, or Firm* — McGuireWoods, LLP

(57) ABSTRACT

According to an embodiment, an invert emulsion drilling fluid comprises: an external phase, wherein the external phase of the drilling fluid comprises a hydrocarbon liquid; an internal phase, wherein the internal phase of the drilling fluid comprises a hygroscopic liquid; and a suspending agent, wherein the suspending agent is a polymer comprising urea linkages or urea and urethane linkages. According to certain embodiments, the hygroscopic liquid comprises a salt and a suitable solvent. According to other embodiments, the hygroscopic liquid comprises an alcohol. In certain embodiments, the drilling fluid does not contain an organophilic clay or organophilic lignite. According to another embodiment, a method of using the invert emulsion drilling fluid comprises: introducing the drilling fluid into at least a portion of a subterranean formation.

17 Claims, No Drawings

(56) References Cited

OTHER PUBLICATIONS

Baroid Product Data Sheet, Halliburton Energy Services, Inc. Literature, Mar. 25, 2010.
Baracarb Product Data Sheet, Halliburton Energy Services, Inc. Literature, Mar. 24, 2010.
Barodense Product Data Sheet, Halliburton Energy Services, Inc. Literature, Mar. 25, 2010.
Micromax, Halliburton Energy Services, Inc. Literature, Aug. 2007.
Adapta Product Data Sheet, Halliburton Energy Services, Inc. Literature, Mar. 2, 2010.
Innovert High Performance Paraffin/Mineral Oil-Based Fluids from Baroid, Halliburton Energy Services, Inc. Literature, May 2008.
Fann Model 35 Viscometer Product Information, Fann Instrument Company, 2007.
Escaid Hydrocarbon Fluids, Exxon Mobil Chemical Company, www.exxonmobilchemical.com/Chem-English/brands/ hydrocarbon-oxygenated-fluids-applications-hydraulic-fracting.aspx?In=yourindustry, Nov. 24, 2015.
Novatec F Product Information Sheet, Mi SWACO, A Schlumberger Company, 2007.
Crayvallac LA-250 Technical Datasheet, Arkema, http://coatings.specialchem.com/product/a-arkema-crayvallac-la-250, Nov. 24, 2015.
TAU-MOD Product Data Sheet, Halliburton Energy Services, Inc. Literature, Sep. 3, 2010.
Invermul NT, Halliburton Energy Services, Inc. Literature, Mar. 26, 2010.
RM-63, Halliburton Energy Services, Inc. Literature, Mar. 26, 2010.
EZ MUL NT, Halliburton Energy Services, Inc. Literature, Mar. 26, 2010.
Rhemod L, Halliburton Energy Services, Inc. Literature, Aug. 31, 2010.
LE Supermul, Halliburton Energy Services, Inc. Literature, Mar. 26, 2010.
Torq-Trim II, Halliburton Energy Services, Inc. Literature, Mar. 26, 2010.
Petrofree, Halliburton Energy Services, Inc. Literature, Feb. 26, 2015.
MSDS Bio-Base 360, Material Safety Data Sheet, Shrieve Chemical Products, Shrieve Products International, Nov. 7, 2007.
Integrity Bio-Base 300, Material Safety Data Sheet, Integrity Industries, Inc., Jun. 5, 2008.
MSDS Bio-Base 560, Material Safety Data Sheet, Shrieve Chemical Products, Shrieve Products International, Aug. 12, 2005.
ESCAID 110 Fluid, Safety Data Sheet, ExxonMobil, Dec. 12, 2014.

\* cited by examiner

INVERT EMULSION DRILLING FLUID CONTAINING A HYGROSCOPIC LIQUID AND A POLYMERIC SUSPENDING AGENT

TECHNICAL FIELD

An invert emulsion drilling fluid and methods of using the drilling fluid are provided. The drilling fluid contains a hygroscopic liquid as the internal phase and a suspending agent of a polymer comprising urea linkages. In an embodiment, the polymer also comprises urethane linkages. In certain embodiments, the hygroscopic liquid is a salt solution and in other embodiments, the hygroscopic liquid comprises an alcohol. In an embodiment, the drilling fluid does not contain an organophilic clay or lignite. According to some embodiments, the drilling fluid is used in a water-sensitive formation. According to other embodiments, the water-sensitive formation is a shale formation.

SUMMARY

According to an embodiment, a method of using an invert emulsion drilling fluid comprises: introducing the drilling fluid into at least a portion of a subterranean formation, wherein the drilling fluid comprises: an external phase, wherein the external phase of the drilling fluid comprises a hydrocarbon liquid; an internal phase, wherein the internal phase of the drilling fluid comprises a hygroscopic liquid; and a suspending agent, wherein the suspending agent is a polymer, wherein the polymer comprises urea linkages.

According to another embodiment, an invert emulsion drilling fluid comprises: an external phase, wherein the external phase of the drilling fluid comprises a hydrocarbon liquid; an internal phase, wherein the internal phase of the drilling fluid comprises a hygroscopic liquid; and a suspending agent, wherein the suspending agent is a polymer, and wherein the polymer comprises urea linkages.

According to another embodiment, an invert emulsion drilling fluid comprises: an external phase, wherein the external phase of the drilling fluid comprises a hydrocarbon liquid; an internal phase, wherein the internal phase of the drilling fluid comprises a hygroscopic liquid, wherein the hygroscopic liquid is selected such that the drilling fluid has an activity less than or equal to the amount needed to obtain a shale retention value of greater than 90%, when tested on a shale formation sample, and wherein the drilling fluid does not contain an organophilic clay or organophilic lignite.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, the term "emulsion" means a colloid in which an aqueous liquid is the continuous (or external) phase and a hydrocarbon liquid is the dispersed (or internal) phase. As used herein, the term "invert emulsion" means a colloid in which a hydrocarbon liquid is the external phase. Of course, there can be more than one internal phase of the emulsion or invert emulsion, but only one external phase. For example, there can be an external phase which is adjacent to a first internal phase, and the first internal phase can be adjacent to a second internal phase. Any of the phases of an emulsion or invert emulsion can contain dissolved materials and/or undissolved solids.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 100 lb/100 sq ft (47.88 Pa) will become a gel. Alternatively, generally, a substance with a 10 minute gel strength less than 100 lb/100 sq ft (47.88 Pa) will remain in a fluid state.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

Some subterranean formations can be adversely affected by certain types of drilling fluids. One example of a formation that can be adversely affected by certain types of drilling fluids is a water-sensitive formation. One example of a drilling fluid that contains water is a "traditional" invert emulsion. A traditional invert emulsion contains a hydrocarbon liquid as the external phase and water as the internal phase. When a drilling fluid contains water, and the water comes in contact with a water-sensitive formation, then the water can adversely affect the subterranean formation. Some of the adverse effects can include swelling or sloughing of the subterranean formation, or gumbo formation.

An example of a water-sensitive formation is a shale formation. Shale formations are different from other types of formations, and there are even differences between individual shale formations. Typically, no two shale formations are the same. Therefore, finding ways to explore and develop shale gas from these formations is a challenge. However, exploration and production of shale gas as an alternative to natural gas produced from "traditional formations" continues to receive increased interest due to the vast quantity of unproduced shale gas around the world, and especially in North America. For example, it is estimated that there is over 3 trillion cubic feet (Tcf) of shale gas in North America alone that is available for production.

In order to help minimize some of the adverse effects water can have on a water-sensitive formation, a traditional invert emulsion typically contains an internal phase of an aqueous solution of salt. The salt-water solution can accomplish several goals, including, lowering the activity of the internal phase of the emulsion, maintaining a sufficient hydrostatic pressure in the wellbore, and binding of the water molecules included in the internal phase.

Activity refers to the vapor pressure of water molecules in an aqueous solution compared with that of pure water. Activity is expressed mathematically as the ratio of two vapor pressures as follows: $a_w = p/p_o$, where p is the vapor pressure of the solution and $p_o$ is the vapor pressure of pure water. By increasing the concentration of salt (or other solutes) in the solution, $a_w$ decreases, because the vapor pressure of the solution decreases.

Hydrostatic pressure means the force per unit area exerted by a column of fluid at rest. Two factors that can affect the hydrostatic pressure are the density of the fluid and the depth of the fluid below the earth's surface or the surface of a body of water. Hydrostatic pressure can be calculated using the equation: $P=MW*depth*0.052$, where MW is the density of the fluid in pounds per gallon (ppg), depth is the true vertical depth in feet, and 0.052 is a unit conversion factor to units of pounds per square inch (psi). A fluid overbalance is generally performed by placing a fluid, such as a completion brine, into the annulus at a hydrostatic pressure that exceeds the pressure exerted by fluids in the subterranean formation. In this manner, the greater pressure on the wall of the wellbore helps to keep the formation from collapsing into the annular space.

A substance that can bind water molecules is often referred to as a hygroscopic substance. Hygroscopicity is the ability of a substance to attract and hold water molecules from the surrounding environment through either absorption or adsorption. The hygroscopic nature of salt can lower the activity of a salt solution and can help prevent the water in the internal phase from flowing into and contacting the water-sensitive formation, thus minimizing swelling or sloughing of the formation. The hygroscopic nature of some alcohols can also lower the activity of an alcohol-water solution.

Commonly-used salts in a traditional invert emulsion include, but are not limited to, sodium chloride, calcium chloride, calcium bromide, potassium chloride, potassium bromide, magnesium chloride, potassium acetate, potassium formate, and magnesium sulfate, with the most common being calcium chloride.

During well completion, it is common to introduce a cement composition into a portion of an annulus in a wellbore. Cement compositions can also be used in primary or secondary cementing operations, well-plugging, or gravel packing operations. During well completion, for example, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead.

A spacer fluid can be introduced into the wellbore after a wellbore is formed and before a cement composition is introduced into the well. The spacer fluid can be circulated downwardly through a drill string or tubing string and up through the annulus. The spacer fluid functions to remove the drilling fluid from the wellbore. However, certain types of drilling fluids are more difficult to remove with a spacer fluid compared to other types of drilling fluids.

In addition to salt, another common ingredient included in a traditional invert emulsion is an organophilic clay or organophilic lignite. As used herein, the term "organophilic" means a substance that associates with organic and oily surfaces and liquids and rejects aqueous systems. As used herein, the term "organophilic clay" and "organophilic lignite" means a clay or lignite that has been coated with a fatty-acid quaternary amine to make the substance oil dispersible. Commonly-used clays include bentonite, hectorite, attapulgite, and sepiolite. Recent technology, as described for example in U.S. Pat. Nos. 7,462,580 and 7,488,704, issued on Dec. 9, 2008 and Feb. 10, 2009 respectively to Jeff Kirsner et al., introduced "clay-free" invert emulsion-based drilling fluids, which offer significant advantages over drilling fluids containing organophilic clays. As used herein, the term "clay-free" means a drilling fluid that does not contain any organophilic clay or lignite.

Usually, an increase in the viscosity of a base fluid, excess colloidal solids, or both, will increase the plastic viscosity ("PV") of a fluid. Plastic Viscosity (PV) is obtained from the Bingham-Plastic rheological model and represents the viscosity of a fluid when extrapolated to infinite shear rate. The PV value can have an effect on the equivalent circulating density ("ECD") and the rate of penetration ("ROP") of a drilling fluid. ECD is the effective circulating density exerted by a fluid against the formation taking into account the flow rate and pressure drop in the annulus above the point being considered and measured as the difference in a drilling fluid's measured surface density at the well head and the drilling fluid's equivalent circulating density downhole. A low ECD is when the difference between the surface density and the equivalent circulating density downhole is relatively small. A high PV may increase the ECD due to a greater pressure drop in the annulus caused by internal fluid friction. A low PV may help minimize the amount of density increase, or equivalent circulating density caused by pumping the fluid. ROP is how quickly a drill bit forms a wellbore (i.e., the rate at which the drill bit penetrates a subterranean formation). A low PV may indicate that the fluid is capable of drilling rapidly because, among other things, the low viscosity of fluid exiting the drill bit and the ability to use an increased flow rate. In addition to desiring a low PV value, it is also desirable to have a low ECD and a high ROP.

Clay-free invert emulsion drilling fluids, like INNOVERT® drilling fluid, marketed by Halliburton Energy Services, Inc., for example, have been shown to yield high performance in drilling, including lower ECD's and improved ROP.

There is a continuing need and thus ongoing industry-wide interest in new drilling fluids that provide improved performance while being environmentally-friendly and economical.

It has been discovered that an invert emulsion drilling fluid containing: an internal phase comprising a hygroscopic liquid; and a polymeric suspending agent comprising urea or urea-urethane linkages can be used in water-sensitive subterranean formations, such as a shale formation. According to certain embodiments, the invert emulsion drilling fluid does not contain an organophilic clay or organophilic lignite. The invert emulsion drilling fluid can be more environmentally-friendly and can provide improved performance compared to some traditional invert emulsion drilling fluids that use organophilic lay or lignite. The invert emulsion drilling fluid can include a hygroscopic liquid of either a salt solution or an alcohol solution and can have lower ECD's and a higher ROP compared to other drilling fluids.

Some of the desirable properties of an invert emulsion drilling fluid include: the invert emulsion remains stable; the invert emulsion exhibits a suitable sag factor; the invert emulsion exhibits good rheology; the invert emulsion exhibits low fluid loss into the subterranean formation; and the invert emulsion produces a high shale retention value.

If any test (e.g., rheology or fluid loss) requires the step of mixing, then the invert emulsion drilling fluid is mixed according to the following procedures. A known volume (in units of barrels) of the external phase is added to a mixing container and the container is then placed on a mixer base. The motor of the base is then turned on and maintained at 11,000 revolutions per minute (rpm). Any of the following ingredients are then added to the external phase and mixed for at least 5 minutes before adding the next ingredient, wherein the ingredients are added in order of the first ingredient to last ingredient as follows: an emulsifier and an emulsifier activator; a viscosifier; a filtercake control agent; the suspending agent; the internal phase; additional viscosifiers; additive to simulate drilling solids; and a weighting agent. The ingredients can be added at a stated concentration of weight by volume of the drilling fluid, for example, in units of pounds per barrel of the drilling fluid. It is to be understood that any mixing is performed at ambient temperature and pressure (about 71° F. (22° C.) and about 1 atm (0.1 MPa)).

It is also to be understood that if any test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min). After the drilling fluid is ramped up to the specified temperature and possibly pressure, the drilling fluid is maintained at that temperature and pressure for the duration of the testing.

A desirable property of a colloid is that the internal phase of the colloid is uniformly distributed throughout the external phase. In the case of an emulsion, a surfactant or an emulsifier can be used to uniformly distribute the internal liquid phase throughout the external liquid phase. In the case of a slurry, a suspending agent can be used to uniformly distribute the undissolved solids throughout the external liquid phase. As used herein, a "stable" invert emulsion drilling fluid means that the invert emulsion will not cream, flocculate, or coalesce and that the majority of any undissolved solids will not settle after being tested according to the test conditions listed below. As used herein, the term "cream" means at least some of the droplets of the internal phase converge towards the surface or bottom of the emulsion (depending on the relative densities of the liquids making up the external and internal phases). The converged droplets maintain a discrete droplet form. As used herein, the term "flocculate" means at least some of the droplets of the internal phase combine to form small aggregates in the emulsion. As used herein, the term "coalesce" means at least some of the droplets of the internal phase combine to form larger drops in the emulsion. Stability testing is performed according to API 131 Recommended Practice for Laboratory Testing of Drilling Fluids, by placing the drilling fluid in a stainless steel ageing cell. The ageing cell is then pressurized with nitrogen gas to prevent the fluid from vaporizing and placed on in a hot rolling oven at a specified temperature. The container is then rolled at a specified temperature for a specified time. The ageing cell is then removed from the rolling oven and visually inspected to determine if the drilling fluid is stable.

Another desirable property of a drilling fluid is a good sag factor. As used herein, only drilling fluids that are considered "stable" after performing stability testing are tested for the "sag factor" (SF) as follows. The drilling fluid is placed into a high-temperature, high-pressure aging cell. The drilling fluid is then static aged at a specified temperature for a specified period of time. The specific gravity (SG) of the drilling fluid is measured at the top of the fluid and at the bottom part of the fluid in the aging cell. The sag factor is calculated using the following formula: $SF=SG_{bottom}/(SG_{bottom}+SG_{top})$. A sag factor of greater than 0.53 indicates that the fluid has a potential to sag; therefore, a sag factor of less than or equal to 0.53 is considered to be a good sag factor.

Another desirable property of a drilling fluid is that the fluid exhibit good rheology. Rheology is a measure of how a material deforms and flows. As used herein, the "rheology" of a drilling fluid is measured according to API 13B-2 section 6.3, Recommended Practice for Field Testing of Oil-based Drilling Fluids as follows. The drilling fluid is mixed. The drilling fluid is placed into the test cell of a rotational viscometer, such as a FANN® Model 35 viscometer, fitted with a Bob and Sleeve attachment and a spring number 1. The drilling fluid is tested at the specified temperature and ambient pressure, about 1 atm (0.1 MPa). Rheology readings are taken at multiple rpm's, for example, at 3, 6, 100, 200, 300, and 600.

A substance can develop gel strength. As used herein, the "initial gel strength" of a drilling fluid is measured according to API 13B-2 section 6.3, Recommended Practice for Field Testing of Oil-based Drilling Fluids as follows. After the rheology testing of the substance is performed, the substance is allowed to sit in the test cell for 10 seconds (s). The motor of the viscometer is then started at 3 rpm. The maximum deflection on the dial reading is then multiplied by 0.48 to obtain the gel strength at 10 s in units of lb/100 sq ft. As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is multiplied by 0.48 to obtain the gel strength at 10 min in units of lb/100 sq ft.

As used herein, the "plastic viscosity" of a drilling fluid is obtained from the Bingham-Plastic rheological model and calculated as the difference between the 600 rpm and 300 rpm dial readings from the rheology testing, expressed in units of cP.

The yield point ("YP") is defined as the value obtained from the Bingham-Plastic rheological model when extrapolated to a shear rate of zero. As used herein, the "yield point" of a drilling fluid is calculated as the difference between the plastic viscosity and the 300 rpm dial reading, expressed in units of lb/100 sq ft. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. A more convenient means of estimating the yield stress is by calculating the low-shear yield point ("LSYP") by subtracting (2*the 3 rpm reading) from the 6 rpm reading, expressed in units of lb/100 sq ft.

Another desirable property of a drilling fluid is a low fluid loss. As used herein, the "fluid loss" of a drilling fluid is tested according to API 13B-2 section 7, Recommended Practice for Field Testing of Oil-based Drilling Fluids procedure at a specified temperature and pressure differential as follows. The drilling fluid is mixed. The heating jacket of the testing apparatus is preheated to approximately 6° C. (10° F.) above the specified temperature. The drilling fluid is stirred for 5 min. using a field mixer. The drilling fluid is poured into the filter cell. The testing apparatus is assembled with a filter paper inserted into the apparatus. The drilling fluid is heated to the specified temperature. When the drilling fluid reaches the specified temperature, the lower valve stem is opened and the specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min. The total mL of fluid loss is then multiplied by 2 to obtain the API fluid loss for the drilling fluid in units of mL/30 min.

If the drilling fluid is to be used in a shale formation, then another desirable property of the drilling fluid is a high shale retention value. A shale erosion test is commonly employed to determine the ability of a drilling fluid and/or the additives therein to prevent a shale formation from eroding. Such erosion, when encountered in actual field conditions in a borehole, and as noted above, can lead to problems ranging from sloughing, to a washout, to a complete collapse of the borehole. As used herein, the "shale retention" test is performed as follows. The drilling fluid is mixed. A portion of a specified shale formation is crushed and ground into particles that passed through a 5 mesh screen but are retained on a 10 mesh screen. 30 grams (g) of the ground shale and 1 barrel (350 mL) of the drilling fluid are placed into a pint jar (350 ml). The shale/drilling fluid mixture is then rolled on a rolling apparatus at a temperature of 150° F. (65.5° C.) for 16 hours. The drilling fluid is then screened through the 10 mesh screen and the retained solids are washed, dried, and weighed. The percent of erosion is calculated based on the weight loss of the ground shale, corrected for the moisture content of the original sample. The shale erosion value minus 100% corresponds to the shale retention value. A shale retention value of greater than or equal to 95% indicates a high shale retention value.

Any of the ingredients included in the drilling fluid can be inherently biodegradable. Inherent biodegradability refers to tests which allow prolonged exposure of the test substance to microorganisms. As used herein, a substance with a biodegradation rate of >20% is regarded as "inherently primary biodegradable." A substance with a biodegradation rate of >70% is regarded as "inherently ultimate biodegradable." A substance passes the inherent biodegradability test if the substance is either regarded as inherently primary biodegradable or inherently ultimate biodegradable. As used herein, the "inherent biodegradability" of a substance is tested in accordance with OECD guidelines, using the 302 B-1992 Zahn-Wellens test as follows. The test substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no test substance, is run in parallel. The biodegradation process is monitored by determination of DOC (or COD(2)) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

According to an embodiment, a method of using an invert emulsion drilling fluid comprises: introducing the drilling fluid into at least a portion of a subterranean formation, wherein the drilling fluid comprises: an external phase, wherein the external phase of the drilling fluid comprises a hydrocarbon liquid; an internal phase, wherein the internal phase of the drilling fluid comprises a hygroscopic liquid; and a suspending agent, wherein the suspending agent is a polymer, wherein the polymer comprises urea linkages.

According to another embodiment, an invert emulsion drilling fluid comprises: an external phase, wherein the external phase of the drilling fluid comprises a hydrocarbon liquid; an internal phase, wherein the internal phase of the drilling fluid comprises a hygroscopic liquid; and a suspending agent, wherein the suspending agent is a polymer, and wherein the polymer comprises urea linkages.

According to another embodiment, an invert emulsion drilling fluid comprises: an external phase, wherein the external phase of the drilling fluid comprises a hydrocarbon liquid; an internal phase, wherein the internal phase of the drilling fluid comprises a hygroscopic liquid, wherein the hygroscopic liquid is selected such that the drilling fluid has an activity less than or equal to the amount needed to obtain a shale retention value of greater than 90%, when tested on a shale formation sample, and wherein the drilling fluid does not contain an organophilic clay or organophilic lignite.

The discussion of preferred embodiments regarding the drilling fluid or any ingredient in the drilling fluid, is intended to apply to the composition embodiments and the method embodiments. Any reference to the unit "gallons" means U.S. gallons.

The drilling fluid is an invert emulsion. The invert emulsion includes only one external phase and at least one internal phase. The external phase comprises a hydrocarbon liquid. The external phase can include dissolved materials or undissolved solids. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkane, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® drilling fluid and ACCOLADE® drilling fluid, marketed by Halliburton Energy Services, Inc.

The drilling fluid includes an internal phase. The internal phase comprises a hygroscopic liquid. According to an embodiment, the hygroscopic liquid comprises an alcohol. Preferably, the alcohol lowers the activity of the internal phase. According to an embodiment, the alcohol is a polyol and includes more than two hydroxyl groups. Preferably, the alcohol is water soluble. As used herein, the term "water soluble" means that more than 1 part of the substance dissolves in 5 parts of water. Preferably, the alcohol comprises a glycerol. The glycerol can be polyglycerol. One of the advantages to using glycerol compared to polyglycerol is that glycerol is less expensive than polyglycerol. As such, the cost of using glycerol can be comparable to invert emulsions that use salt instead of an alcohol. According to an embodiment, when the hygroscopic liquid comprises an alcohol, then the drilling fluid does not include a water-soluble salt. According to this embodiment, neither the hygroscopic liquid nor the water contains a dissolved salt. The internal phase can be in a concentration in the range of about 0.5% to about 60% by volume of the external phase. The internal phase can also be in a concentration of about 15% to about 45% by volume of the external phase. If the internal phase further includes water, then the water can be freshwater. The water can be in a concentration in the range of about 5% to about 90% by weight of the internal phase of the drilling fluid. If the internal phase includes the alcohol and water, then the alcohol can be in a concentration in the range of about 5% to about 90% by weight of the internal phase.

According to another embodiment, the hygroscopic liquid comprises a salt and a suitable solvent. The salt can be selected from the group consisting of sodium chloride, calcium chloride, calcium bromide, potassium chloride, potassium bromide, magnesium chloride, potassium acetate, potassium formate, magnesium sulfate, and combinations thereof. The suitable solvent can be any liquid that is capable of solubilizing the salt and forming a solution. One of skill in the art will be able to select the suitable solvent based on the specific salt used. According to an embodiment, the solvent is selected such that all of the salt dissolves in the solvent to form the hygroscopic liquid. It is to be understood that the internal phase can include other ingredients in addition to the salt and the suitable solvent. The other ingredients can be a liquid, solutes dissolved in the solvent, or undissolved solids. Examples of suitable solvents include, but are not limited to, water and an alcohol, such as methanol or ethanol. The water can be freshwater. The internal phase can be in a concentration in the range of about 0.5% to about 60% by volume of the external phase. The salt of the internal phase can be in a concentration in the range of about 2% to about 40% by weight of the internal phase. The solvent in the internal phase can be in a concentration in the range of about 60% to about 90% by weight of the internal phase. It is to be understood that the stated concentrations can differ depending on the specific salt and solvent that are used, as each salt will have its own unique maximum solubility in the particular solvent.

The drilling fluid includes a suspending agent. The suspending agent is a polymer comprising urea linkages. In an embodiment, the polymer further comprises urethane linkages. A polymer is a large molecule composed of repeating units typically connected by covalent chemical bonds. A polymer can be formed from the polymerization reaction of monomers. A polymer formed from one type of monomer is called a homopolymer. A copolymer is formed from two or more different types of monomers. In the polymerization reaction, the monomers are transformed into the repeating units of a polymer. For a copolymer, the repeating units for each of the monomers can be arranged in various ways along the polymer chain. For example, the repeating units can be random, alternating, periodic, or block. A polymer can also be formed in a step-wise fashion. For example, a first polymer, commonly called a pre-polymer, can first be formed from the polymerization of one or more different types of monomers. In the second step, the pre-polymer can be polymerized with a final monomer(s) to form the polymer. A polymer can also be formed in a step-wise fashion by first polymerizing two different pre-polymers, and then polymerizing both of the pre-polymers to form the polymer. A polymer has an average molecular weight, which is directly related to the average chain length of the polymer. The average molecular weight for a copolymer can be expressed as follows:

$$\text{Avg. molecular weight}=(M.W.m_1 * RU\ m_1)+(M.W.m_2\ RU\ m_2)\ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. For a polymer that is formed in a step-wise fashion, the molecular weight of the polymer is: the average molecular weight of the pre-polymer plus the molecular weight of the final monomer(s) times the number of repeating units of the final monomer(s); or the average molecular weight of both of the pre-polymers added together.

A compound containing an isocyanate functional group can be referred to as an isocyanate, a compound containing an amine functional group can be referred to as an amine, and a compound containing a hydroxyl functional group can be referred to as an alcohol. A di-isocyanate is a compound containing two isocyanate functional groups, a diamine is a compound containing two amine functional groups, and a diol is a compound containing two hydroxyl groups. A pre-polyamine is a pre-polymer containing multiple amine functional groups, a pre-polyol is a pre-polymer containing multiple hydroxyl functional groups, a pre-polyisocyanate is a pre-polymer containing multiple isocyanate functional groups, and a pre-polyurethane is a pre-polymer formed from the polymerization of a first monomer containing at least one isocyanate functional group and a second monomer containing at least one hydroxyl functional group and contains multiple isocyanate functional groups. The multiple functional groups of the pre-polymer are available to bond with available functional groups of the final monomer or the available functional groups of another pre-polymer. Any of the monomers and pre-polymers can be aliphatic or aromatic.

The suspending agent can be a polymer comprising urea linkages or urea and urethane linkages. The following examples illustrate some of the possible ways of forming a polymer comprising urea or urea and urethane linkages, but are in no way meant to be all the possible ways of forming the polymer. A polymer comprising urea linkages is formed from the combination of a compound containing two or more isocyanate functional groups and a compound containing two or more amine functional groups, and can be formed by: 1) polymerizing a first monomer of di-isocyanate and a second monomer of diamine; 2) forming a pre-polyisocyanate and then polymerizing the pre-polyisocyanate with a final monomer of diamine; 3) forming a pre-polyamine and then polymerizing the pre-polyamine with a monomer of di-isocyanate; or 4) forming a pre-polyisocyanate and a pre-polyamine and then polymerizing both of the pre-polymers. A polymer comprising urea and urethane linkages is formed from the combination of a compound containing two or more isocyanate functional groups, a compound containing two or more amine functional groups, a compound containing two or more hydroxyl functional groups, or a compound containing combinations of isocyanate, amine, and hydroxyl functional groups, and can be formed by: 1) polymerizing a monomer of di-isocyanate with a mixture of the monomers diol and diamine; 2) forming a pre-polyurethane and then polymerizing the pre-polyurethane with a monomer of diamine; 3) forming a polyisocyanate, polyamine, or polyol pre-polymer and then polymerizing the pre-polymer with the remaining monomers that contain the necessary functional groups (e.g., forming a pre-polyamine and then polymerizing the pre-polyamine with a mixture of monomers containing diol and diamine); or 4) forming more than one pre-polymer and then polymerizing all of the pre-polymers, plus any remaining monomers that contain the necessary functional groups. It is to be understood that any of the compounds containing the necessary functional group can be a monomer or part of a pre-polymer. Of course the pre-polymer can include more than one of the necessary functional groups. It is also to be understood that the polymer and any of the pre-polymers can be natural polymers or synthetic polymers, including resins.

Examples of suitable compounds (e.g., monomers or pre-polymers) containing two or more isocyanate functional groups include, but are not limited to: hexamethylene-diisocyanate (HDI); toluene-diisocyanate (TDI); 2,2'-, 2,4'- and 4,4'-diisocyanatodiphenylmethane (MDI); polymethylenepolyphenyl diisocyanate (PMDI); naphthalene-diisocyanate (NDI); 1,6-diisocyanato-2,2,4-trimethylhexane; isophorone-diisocyanate; (3-isocyanato-methyl)-3,5,5-trimethyl cyclohexyl isocyanate (IPDI); tris(4-isocyanato-phenyl)-methane; phosphoric acid tris-(4-isocyanato-phenyl ester); and thiophosphoric acid tris-(4-isocyanato-phenyl ester).

Examples of suitable compounds (e.g., monomers or pre-polymers) containing two or more amine functional groups include, but are not limited to: hydrazine; ethylenediamine; 1,2-propylenediamine; 1,3-propylenediamine; 1-amino-3-methylaminopropane; 1,4-diaminobutane; N,N'-dimeth-1-ethylenediamine; 1,6-diaminohexane; 1,12-diaminododecane; 2,5-diamino-2,5-dimethylhexane; trimethyl-1,6-hexane-diamine; diethylenetriamine; N,N',N''-trimethyldiethylenetriamine; triethylenetetraamine; tetraethylenepentamine; pentaethylenehexamine; and polyethyleneimine, having average molecular weights of between 250 and 10,000; dipropylenetriamine; tripropylenetetraamine; bis-(3-aminopropyl)amine; bis-(3-aminopropyl)-methylamine; piperazine; 1,4-diaminocyclohexane; isophoronediamine; N-cyclohexyl-1,3-propanediamine; bis-(4-amino-cyclohexyl)methane; bis-(4-amino-3-methyl-cyclohexyl)-methane; bisaminomethyltricyclodecane (TCD-diamine); o-, m- and p-phenylenediamine; 1,2-diamino-3-methylbenzene; 1,3-diamino-4-methylbenzene(2,4-diaminotoluene); 1,3-bisaminomethyl-4,6-dimethylbenzene; 2,4- and 2,6-diamino-3,5-diethyltoluene; 1,4- and 1,6-diaminonaphthalene; 1,8- and 2,7-diaminonaphthalene; bis-(4-amino-phenyl)-methane; polymethylenepolyphenylamine; 2,2-bis-(4-aminophenyl)-propane; 4,4'-oxybisaniline; 1,4-butanediol bis-(3-aminopropyl ether); 2-(2-aminoethylamino)ethanol; 2,6-diamino-hexanoic acid; liquid polybutadienes or acrylonitrile/butadiene copolymers which contain amino groups and have average molecular weights of between 500 and 10,000; and polyethers containing amino groups, e.g., based on polyethylene oxide, polypropylene oxide or polytetrahydrofuran and having a content of primary or secondary amino groups of from 0.25 to approximately 8 mmol/g, preferably 1 to 8 mmol/g. Such compounds are described in: US Patent Publication No. US 2006/0052261 A1, having for named inventors Bernd Kray, Wilhelm Laufer, Patrick Galda, and Achim Fessenbecker, published on Mar. 9, 2006; and US Patent Publication No. US 2006/0058203 A1, having for named inventors Willhelm Laufer, Michael Wuehr, Klaus Allgower, and Patrick Galda, published on Mar. 16, 2006, each of which is incorporated by reference in its entirety. If there is any conflict between a reference incorporated by reference and the present disclosure, the present disclosure will control.

Examples of suitable compounds (e.g., monomers or pre-polymers) containing two or more hydroxyl functional groups include, but are not limited to: polyether polyols, polyester polyols, polycaprolactone polyols, polycarbonate polyols, and combinations thereof.

An example of a suitable commercially-available polymer containing urea linkages (i.e., polyurea) is ADDITIN® M 10411, available from LANXESS India Private Limited, Business Unit—Rhein Chemie in Maharashtra, India. An example of a suitable commercially-available polymer containing urea and urethane linkages (i.e., polyurea-urethane) is CRAYVALLAC LA-250, available from Cray Valley in Paris, France.

The suspending agent can be inherently biodegradable. In an embodiment, the suspending agent is selected such that the emulsion is stable. For example, any undissolved solids in the drilling fluid do not settle to the bottom of the fluid. The suspending agent can be selected such that the drilling fluid has a sag factor less than or equal to 0.53. The suspending agent can be in at least a sufficient concentration such that the drilling fluid has a sag factor less than or equal to 0.53. According to another embodiment, the suspending agent is selected such that the drilling fluid has a 10 minute gel strength less than 40 lb/100 sq ft, alternatively less than 30 lb/100 sq ft, or alternatively less than 20 lb/100 sq ft. The suspending agent can have a concentration such that the drilling fluid has a 10 minute gel strength less than 40 lb/100 sq ft, alternatively less than 30 lb/100 sq ft, or alternatively less than 20 lb/100 sq ft. In another embodiment, the suspending agent is in a concentration of at least 1 pounds per barrel (ppb) of the drilling fluid. The suspending agent can also be in a concentration in the range of about 0.25 to about 15 ppb of the drilling fluid. In an embodiment, the suspending agent is in a concentration in the range of about 2 to about 8 ppb of the drilling fluid.

The drilling fluid can further include a viscosifier. The viscosifier can be selected from the group consisting of an inorganic viscosifier, fatty acids, and combinations thereof.

Commercially-available examples of a suitable viscosifier include, but are not limited to, RHEMOD L®, TAU-MOD®, RM-63™, and combinations thereof, marketed by Halliburton Energy Services, Inc. According to an embodiment, the drilling fluid does not contain an organophilic clay or organophilic lignite. According to this embodiment, the viscosifier can be selected for use in a drilling fluid that does not contain an organophilic clay or organophilic lignite. According to an embodiment, the viscosifier is in a concentration of at least 0.5 ppb of the drilling fluid. The viscosifier can also be in a concentration in the range of about 0.5 to about 20 ppb, alternatively of about 0.5 to about 10 ppb, of the drilling fluid.

The drilling fluid can further include an emulsifier. The emulsifier can be selected from the group consisting of tall oil-based fatty acid derivatives, vegetable oil-based derivatives, and combinations thereof. Commercially-available examples of a suitable emulsifier include, but are not limited to, EZ MUL® NT, INVERMUL® NT, LE SUPERMUL®, and combinations thereof, marketed by Halliburton Energy Services, Inc. According to an embodiment, the emulsifier is in at least a sufficient concentration such that the drilling fluid maintains a stable invert emulsion. According to yet another embodiment, the emulsifier is in a concentration of at least 3 ppb of the drilling fluid. The emulsifier can also be in a concentration in the range of about 3 to about 20 ppb of the drilling fluid.

The drilling fluid can further include an emulsifier activator. The emulsifier activator aids the emulsifier in creating a stable invert emulsion. The emulsifier activator can be a base, such as lime. According to an embodiment, the emulsifier activator is in a concentration of at least 0.5 ppb of the drilling fluid. The emulsifier activator can also be in a concentration in the range of about 0.5 to about 3 ppb of the drilling fluid.

The drilling fluid can further include a weighting agent. The weighting agent can be selected from the group consisting of barite, hematite, manganese tetroxide, calcium carbonate, and combinations thereof. According to an embodiment, the weighting agent is not an organophilic clay or organophilic lignite. Commercially-available examples of a suitable weighting agent include, but are not limited to, BAROID®, BARACARB®, BARODENSE®, MICRONAX™, and combinations thereof, marketed by Halliburton Energy Services, Inc. According to an embodiment, the weighting agent is in a concentration of at least 10 ppb of the drilling fluid. The weighting agent can also be in a concentration in the range of about 10 to about 500 ppb of the drilling fluid. According to another embodiment, the weighting agent is in at least a sufficient concentration such that the drilling fluid has a density in the range of about 9 to about 20 pounds per gallon (ppg) (about 1.078 to about 2.397 kilograms per liter "kg/L"). Preferably, the weighting agent is in at least a sufficient concentration such that the drilling fluid has a density in the range of about 9 to about 18 ppg (about 1.1 to about 2.4 kg/L).

The drilling fluid can further include a fluid loss additive. The fluid loss additive can be selected from the group consisting of methylestyrene-co-acrylate, a substituted styrene copolymer, and combinations thereof. Commercially-available examples of a suitable fluid loss additive include, but are not limited to, ADAPTA®, marketed by Halliburton Energy Services, Inc. According to an embodiment, the fluid loss additive is in at least a sufficient concentration such that the drilling fluid has an API fluid loss of less than 8 mL/30 min at a temperature of 300° F. (149° C.) and a pressure differential of 500 psi (3.4 megapascals "MPa"). The fluid loss additive can also be in at least a sufficient concentration such that the drilling fluid has an API fluid loss of less than 5 mL/30 min at a temperature of 300° F. (149° C.) and a pressure differential of 500 psi (3.4 MPa). According to another embodiment, the fluid loss additive is in a concentration of at least 0.5 ppb of the drilling fluid. The fluid loss additive can also be in a concentration in the range of about 0.5 to about 10 ppb of the drilling fluid.

The drilling fluid can also include a friction reducer. Commercially-available examples of a suitable friction reducer include, but are not limited to, TORQ-TRIM® II, graphitic carbon, and combinations thereof, marketed by Halliburton Energy Services, Inc. The friction reducer can be in a concentration of at least 0.5 ppb of the drilling fluid. In an embodiment, the friction reducer is in a concentration in the range of about 0.5 to about 5 ppb of the drilling fluid.

According to certain embodiments, the drilling fluid does not include an organophilic clay or organophilic lignite. The drilling fluid can contain organophilic clay, organophilic lignite, and combinations thereof. The drilling fluid can contain the organophilic clay or lignite at a concentration up to 1 pounds per barrel (ppb) of the drilling fluid. The drilling fluid can also contain the organophilic clay or lignite at a concentration in the range of 0 to about 20 ppb, alternatively of 0 to about 10 ppb, or alternatively from about 3 to about 8 ppb of the drilling fluid.

According to an embodiment, the drilling fluid provides a shale retention value of greater than 90%, in another embodiment greater than 95%, when tested on a portion of a shale formation at a temperature of 150° F. (65.5° C.) for 16 hours. According to another embodiment, the drilling fluid has an activity less than or equal to the amount needed to provide a shale retention value of greater than 90%, in another embodiment greater than 95%, when tested on a portion of a shale formation at a temperature of 150° F. (65.5° C.) for 16 hours. For the embodiment wherein the hygroscopic liquid contains the alcohol, then the alcohol can be selected and in at least a sufficient concentration such that the drilling fluid has an activity less than or equal to the amount needed to provide a shale retention value of greater than 90%, in another embodiment greater than 95%. For the embodiment wherein the hygroscopic liquid contains the salt and a suitable solvent, then the salt and the suitable solvent are selected and are in at least a sufficient concentration such that the drilling fluid has an activity less than or equal to the amount needed to provide a shale retention value of greater than 90%, in another embodiment greater than 95%. According to these embodiments, the particular alcohol and the salt and suitable solvent are selected and in at least a sufficient concentration such that the activity of the internal phase is lowered sufficiently to provide a shale retention value of greater than 90%, in another embodiment greater than 95%. The portion of the shale formation can be obtained from the Pierre shale formation (located east of the Rocky Mountains in the Great Plains, from North Dakota to New Mexico, U.S.A.) or the London clay formation (located southeast of England).

According to the method embodiments, the methods include the step of introducing the drilling fluid into at least a portion of a subterranean formation. Preferably, the at least a portion of the subterranean formation is a water-sensitive formation. More preferably, the at least a portion of the subterranean formation is a shale formation. The step of introducing the drilling fluid can be for the purpose of drilling a wellbore. The drilling fluid can be in a pumpable state before and during introduction into the subterranean formation. The well can be an oil, gas, water, or injection well. The subterranean formation can include an annulus. The step of introducing the drilling fluid can include introducing the drilling fluid into a portion of the annulus.

The methods can further include the step of introducing a spacer fluid into the at least a portion of the subterranean formation after the step of introducing the drilling fluid. The methods can also further include the step of introducing a cement composition into the at least a portion of the subterranean formation. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be performed after the step of introducing the drilling fluid. If the methods also include the step of introducing a spacer fluid, then the step of introducing the cement composition can be performed after the step of introducing the spacer fluid. The step of introducing the cement composition can be for the purpose of at least one of the following: well completion; foam cementing; primary or secondary cementing operations; well-plugging; and gravel packing. The cement composition can be in a pumpable state before and during introduction into the subterranean formation. The step of introducing can include introducing the cement composition into the well. According to another embodiment, the subterranean formation is penetrated by a well and the well includes an annulus. According to this other embodiment, the step of introducing can include introducing the cement composition into a portion of the annulus.

The method embodiments can also include the step of allowing the cement composition to set. The step of allowing can be performed after the step of introducing the cement composition into the subterranean formation. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a drilling fluid is expressed as pounds per barrel of the drilling fluid (abbreviated as "ppb").

Each of the drilling fluids were mixed and tested according to the procedure for the specific test as described in The Detailed Description section above. Rheology testing, initial and 10 minute gel strength, plastic viscosity, yield point, and low-shear yield point tests were conducted at a temperature of 120° F. (48.9° C.). Stability testing was performed at 16 hours, and at a temperature of 250° F. (121° C.) for the drilling fluids in group #1, #3, and #4, and at a temperature of 300° F. (149° C.) for the drilling fluids in group #2. API fluid loss testing was conducted at a pressure differential of 500 psi (3.4 MPa), and a temperature of 250° F. (121° C.) for the drilling fluids in group #1, #3, and #4, and at a temperature of 300° F. (149° C.) for the drilling fluids in group #2. Sag factors were determined after static aging for 48 hours at 250° F. (121.1° C.) for the drilling fluids in group #1, for 24 hours at 250° F. (121.1° C.) for the drilling fluids in groups #3 and #4, and for either 16 hrs or 48 hrs at a temperature of 300° F. (149° C.) for the drilling fluids in group #2. Shale retention testing was performed on samples from the Pierre shale formation and the London clay formation at a temperature of 150° F. (65.6° C.).

Table 1 contains a list of the ingredients and their respective concentrations for eight different drilling fluids. The drilling fluids in group #1 (1A-1E) had a density of 12 ppg (1.438 kg/L) and the drilling fluids in group #2 (2A-2C) had a density of 16 ppg (1.917 kg/L). Group #1 drilling fluids had a ratio of the external phase to the internal phase of 70:30 by volume and group #2 drilling fluids had a ratio of 80:20. The internal phase for each of the drilling fluids contained 60% glycerol and 40% fresh water by weight. The external phase for each of the drilling fluids was ESCAID® 110 paraffin hydrocarbon liquid and is expressed in units of barrels ("bbl"). Each of the drilling fluids also contained the following ingredients, listed at a concentration of ppb of the drilling fluid: EZ MUL® NT emulsifier; Lime emulsifier activator; RHEMOD L® viscosifier; ADAPTA® filter control agent; TAU-MOD® viscosifier; REV DUST drilling solids simulator; and BAROID® weighting agent. The drilling fluids also had varying concentrations of CRAYVALLAC LA-250 suspending agent or ADDITIN® M 10411 suspending agent, listed at a concentration of ppb.

TABLE 1

| Ingredient | Concentrations for Drilling Fluid #1 | | | | | Concentrations for Drilling Fluid #2 | | |
|---|---|---|---|---|---|---|---|---|
| | A | B | C | D | E | A | B | C |
| ESCAID ® 110 | 0.54 | 0.53 | 0.53 | 0.53 | 0.51 | 0.48 | 0.47 | 0.46 |
| Internal Phase | 91.42 | 90.63 | 89.83 | 89.7 | 89.83 | 49.52 | 48.17 | 47.72 |
| EZ MUL ® NT | 11 | 11 | 11 | 11 | 11 | 15 | 15 | 15 |
| Lime | 0.65 | 0.65 | 0.65 | 0.65 | 0.65 | 0.65 | 0.65 | 0.65 |
| RHEMOD L ® | 3 | 3 | 3 | 3 | 3 | 3 | 3 | 3 |
| ADAPTA ® | 4 | 4 | 4 | 4 | 4 | 4 | 4 | 4 |
| TAU-MOD ® | 5 | 5 | 5 | 5 | 5 | 5 | 5 | 5 |
| REV DUST | 20 | 20 | 20 | 20 | 20 | 20 | 20 | 20 |
| BAROID ® | 220.1 | 219.36 | 218.63 | 222.57 | 224.95 | 441.38 | 444.03 | 444.95 |
| CRAYVALLAC LA-250 | — | 3 | 6 | — | — | — | — | — |
| ADDITIN ® M 10411 | — | — | — | 2.5 | 5 | — | 3 | 4 |

Table 2 contains rheology data, initial and 10 min gel strength, plastic viscosity, yield point, and low-shear yield point data for the drilling fluids. As can be seen in Table 2, drilling fluids 1B-1E and 2B and 2C exhibited comparable rheologies compared to the drilling fluids 1A and 2A that did not contain a suspending agent. Moreover, the drilling fluids that contained a higher concentration of suspending agent had slightly higher rheologies compared to the drilling fluids that contained a lower concentration of suspending agent.

TABLE 2

| Drilling Fluid | Rheology rpm's | | | | | | Initial Gel Strength | 10 min Gel Strength | Plastic Viscosity | Yield Point | Low-shear Yield Point |
|---|---|---|---|---|---|---|---|---|---|---|---|
| | 600 | 300 | 200 | 100 | 6 | 3 | | | | | |
| 1A | 59 | 38 | 31 | 22 | 7 | 6 | 6 | 9 | 21 | 17 | 5 |
| 1B | 62 | 40 | 32 | 22 | 8 | 7 | 7 | 10 | 22 | 18 | 6 |
| 1C | 78 | 51 | 41 | 29 | 10 | 9 | 9 | 12 | 27 | 24 | 8 |
| 1D | 69 | 42 | 33 | 23 | 7 | 6 | 7 | 11 | 27 | 15 | 5 |
| 1E | 86 | 54 | 42 | 29 | 10 | 9 | 11 | 19 | 32 | 22 | 8 |
| 2A | 106 | 58 | 42 | 24 | 4 | 3 | 3 | 6 | 48 | 10 | 2 |
| 2B | 111 | 63 | 47 | 30 | 8 | 7 | 8 | 10 | 48 | 15 | 6 |
| 2C | 115 | 67 | 49 | 31 | 8 | 7 | 7 | 11 | 48 | 19 | 6 |

Table 3 contains stability, fluid loss, sag factor, and shale retention data for the drilling fluids. It should be noted that only the drilling fluids that were considered "stable" were tested for the sag factor. As can be seen in Table 3, in order to produce a stable fluid, the concentration of the suspending agent may need to be increased. Each of the stable drilling fluids had a sag factor of less than 0.53. This indicates that the fluid will remain stable and any undissolved solids will remain suspended in the fluid. Additionally, the drilling fluids 1C and 1E provided a shale retention value of at least 97.5%. Similarly, drilling fluid 2B, having a suspending agent concentration of 3 ppb, provided a shale retention value of 98.5. This indicates that if the drilling fluids are used in a shale formation, then it is very likely that the drilling fluids will cause minimal erosion of the shale formation.

TABLE 3

| Drilling Fluid | Stability | Fluid Loss (mL/30 min) | Sag Factor (16 hr/48 hr) | Shale Retention Pierre Shale | Shale Retention London Clay |
|---|---|---|---|---|---|
| #1A | Settling | — | —/— | — | — |
| #1B | Settling | — | —/— | — | — |
| #1C | Stable | 2 | —/0.52 | 100% | 97.5% |
| #1D | Stable | 2 | —/0.51 | — | — |
| #1E | Stable | 2 | —/— | 99.5% | — |
| #2A | Settling | — | —/— | — | — |
| #2B | Stable | 3 | 0.52/— | 98.5% | — |
| #2C | Stable | 2.8 | —/0.527 | — | — |

Table 4 contains a list of the ingredients and their respective concentrations for four different drilling fluids. The drilling fluids in group #3 (3A-3B) and group #4 (4A-4B) had a density of 12 ppg (1.438 kg/L). These drilling fluids contained a hygroscopic solution of calcium chloride and freshwater at a concentration of 250,000 parts per million (ppm) of the water. The drilling fluids had a ratio of the external phase to the salt solution internal phase of 70:30. The salt solution is expressed in a concentration of ppb of the drilling fluid, which is the weight of the total solution, including the salt and the water. The external phase for the drilling fluids in group #3 was ESCAID® 110 paraffin hydrocarbon liquid and in group #4 was diesel, expressed in units of barrels ("bbl"). Each of the drilling fluids also contained the following ingredients, listed at a concentration of ppb of the drilling fluid: EZ MUL® NT emulsifier; Lime emulsifier activator; RHEMOD viscosifier; ADAPTA® fluid loss additive and BAROID® weighting agent. Some of the drilling fluids also included ADDITIN® M 10411 suspending agent, listed at a concentration of ppb of the drilling fluid.

TABLE 4

| Ingredient | Concentrations for Drilling Fluid #3 | | Concentrations for Drilling Fluid #4 | |
|---|---|---|---|---|
| | A | B | A | B |
| ESCAID ® 110 | 0.54 | 0.53 | — | — |
| Diesel | — | — | 0.54 | 0.54 |
| CaCl$_2$ Solution | 114.90 | 113.81 | 116.0 | 114.9 |
| EZ MUL ® NT | 10 | 10 | 10 | 10 |
| Lime | 1.5 | 1.5 | 1.5 | 1.5 |
| RHEMOD L ® | 3 | 3 | 3 | 3 |
| ADAPTA ® | 2 | 2 | 2 | 2 |
| BAROID ® | 224.21 | 223.66 | 212.03 | 211.67 |
| ADDITIN ® M 10411 | — | 3 | — | 3 |

Table 5 contains rheology data, initial and 10 min gel strength, plastic viscosity, yield point, and low-shear yield point data for the drilling fluids. As can be seen in Table 5, drilling fluids 3B and 4B exhibited comparable rheologies compared to the drilling fluids 3A and 4A that did not contain a suspending agent. The drilling fluids in group #4 containing diesel as the external phase had slightly higher values across Table 5 compared to the drilling fluids in group #3 containing ESCAID® 110 as the external phase.

TABLE 5

| Drilling Fluid | Rheology rpm's | | | | | | Initial Gel Strength | 10 min Gel Strength | Plastic Viscosity | Yield Point | Low-shear Yield Point |
|---|---|---|---|---|---|---|---|---|---|---|---|
| | 600 | 300 | 200 | 100 | 6 | 3 | | | | | |
| #3A | 31 | 18 | 13 | 8 | 2 | 1 | 2 | 2 | 13 | 5 | 0 |
| #3B | 45 | 26 | 18 | 12 | 3 | 2 | 3 | 10 | 19 | 7 | 1 |
| #4A | 55 | 35 | 27 | 18 | 6 | 4 | 5 | 5 | 20 | 15 | 2 |
| #4B | 66 | 42 | 32 | 22 | 5 | 4 | 5 | 9 | 24 | 18 | 3 |

Table 6 contains stability, fluid loss, and sag factor data for the drilling fluids. It should be noted that only the drilling fluids that were considered "stable" were tested for the sag factor. As can be seen in Table 6, drilling fluids #3B and 4B, containing the suspending agent, had a sag factor of less than 0.53. This indicates that theses fluids will remain stable and any undissolved solids will remain suspended in the fluid. Moreover, each of the drilling fluids exhibited good fluid loss properties.

TABLE 6

| Drilling Fluid | Stability | Fluid Loss (mL/30 min) | Sag Factor |
| --- | --- | --- | --- |
| #3A | Stable | 2.2 | 0.68 |
| #3B | Stable | 2 | 0.52 |
| #4A | Stable | 2.4 | 0.67 |
| #4B | Stable | 2 | 0.52 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of drilling a subterranean formation with an invert emulsion drilling fluid, the method comprising:
    introducing the drilling fluid into at least a portion of the subterranean formation,
        wherein the at least a portion of the subterranean formation is a water-sensitive formation, and wherein the drilling fluid comprises:
            an external phase,
            wherein the external phase of the drilling fluid comprises a hydrocarbon liquid;
            an internal phase,
            wherein the internal phase of the drilling fluid comprises a hygroscopic liquid;
            a suspending agent,
            wherein the suspending agent is a polymer, wherein the polymer comprises urea linkages, and
            a friction reducer,
            wherein the friction reducer is in a concentration in the range of about 0.5 to about 5 pounds per barrel of the drilling fluid,
        wherein the drilling fluid does not contain an organophilic clay or organophilic lignite, and wherein the drilling fluid provides a shale retention value of greater than 90%, when tested on a portion of a shale formation at a temperature of 150° F. for 16 hours.

2. The method according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The method according to claim 1, wherein the hygroscopic liquid comprises an alcohol.

4. The method according to claim 3, wherein the alcohol comprises a glycerol.

5. The method according to claim 4, wherein the glycerol is polyglycerol.

6. The method according to claim 1, wherein the hygroscopic liquid comprises a salt and a suitable solvent.

7. The method according to claim 6, wherein the salt is selected from the group consisting of sodium chloride, calcium chloride, calcium bromide, potassium chloride, potassium bromide, magnesium chloride, potassium acetate, potassium formate, magnesium sulfate, and combinations thereof.

8. The method according to claim 6, wherein the solvent is selected such that the salt is capable of dissolving in the solvent to form a salt solution.

9. The method according to claim 1, wherein the internal phase is in a concentration in the range of about 0.5% to about 60% by volume of the external phase.

10. The method according to claim 1, wherein the internal phase further comprises water.

11. The method according to claim 10, wherein the water is in a concentration in the range of about 5% to about 90% by weight of the internal phase.

12. The method according to claim 1, wherein the polymer further comprises urethane linkages.

13. The method according to claim 1, wherein the suspending agent is in at least a sufficient concentration such that the drilling fluid has a sag factor less than or equal to 0.53.

14. The method according to claim 1, wherein the suspending agent is in a concentration in the range of about 0.25 to about 15 pounds per barrel of the drilling fluid.

15. The method according to claim 1, wherein the water-sensitive formation is a shale formation.

16. The method according to claim 1, further comprising the step of introducing a spacer fluid into the at least a portion of the subterranean formation after the step of introducing the drilling fluid.

17. The method according to claim 16, further comprising the step of introducing a cement composition into the at least a portion of the subterranean formation after the step of introducing the spacer fluid.

* * * * *